(12) United States Patent
Allen et al.

(10) Patent No.: US 8,103,970 B1
(45) Date of Patent: Jan. 24, 2012

(54) METHOD AND DEVICE FOR PROVIDING A MULTI-LEVEL USER INTERFACE HAVING A DYNAMIC KEY ASSIGNMENT FOR A CELLULARLY COMMUNICATIVE DEVICE

(75) Inventors: Michelle Allen, Basking Ridge, NJ (US); Arne Dettki, Munich (DE); Giuseppe Damiani, London (GB)

(73) Assignee: Cellco Partnership, Basking Ridge, NJ (US)

( * ) Notice: Subject to any disclaimer, the term of this patent is extended or adjusted under 35 U.S.C. 154(b) by 766 days.

(21) Appl. No.: 10/796,403

(22) Filed: Mar. 8, 2004

(51) Int. Cl.
*G06F 3/00* (2006.01)

(52) U.S. Cl. ........ 715/841; 715/738; 715/762; 715/764; 715/810; 715/838

(58) Field of Classification Search .................. 715/841, 715/845, 817–820, 812, 738, 762, 764, 810, 715/838, 839, 853
See application file for complete search history.

(56) References Cited

U.S. PATENT DOCUMENTS

| | | | |
|---|---|---|---|
| 4,291,198 A | | 9/1981 | Anderson et al. |
| 5,477,262 A | * | 12/1995 | Banker et al. .................. 725/38 |
| 5,704,051 A | * | 12/1997 | Lane et al. ..................... 715/855 |
| 6,009,519 A | | 12/1999 | Jones et al. |
| 6,084,951 A | * | 7/2000 | Smith et al. ................. 379/93.17 |
| 6,763,226 B1 | * | 7/2004 | McZeal, Jr. ................... 455/90.2 |
| 6,781,575 B1 | * | 8/2004 | Hawkins et al. .............. 345/173 |
| 7,152,213 B2 | * | 12/2006 | Pu et al. ........................ 715/812 |
| 7,505,796 B2 | * | 3/2009 | Stephens .................... 455/575.1 |
| 2004/0051741 A1 | | 3/2004 | Venturino |
| 2005/0076312 A1 | * | 4/2005 | Gardner et al. ............... 715/853 |

* cited by examiner

*Primary Examiner* — William Bashore
*Assistant Examiner* — Meseker Takele
(74) *Attorney, Agent, or Firm* — McDermott Will & Emery LLP

(57) ABSTRACT

A method and system for providing a user interface over a display screen of a cellularly communicative electronic device are disclosed. One such method can include the steps of: (i) concurrently providing on a first display screen, a first menu level providing one or more functional groupings and a second menu level providing one or more choices within at least one of the functional groupings; (ii) permitting a user to advance a cursor freely across the first menu level and the second menu level to select a desired choice within the one or more choices; and (iii) providing at least a second display screen in response to the selection of the desired choice, wherein a dynamic key assignment is displayed for a key included in a device keypad and wherein the dynamic key assignment is a function of the desired choice.

10 Claims, 7 Drawing Sheets

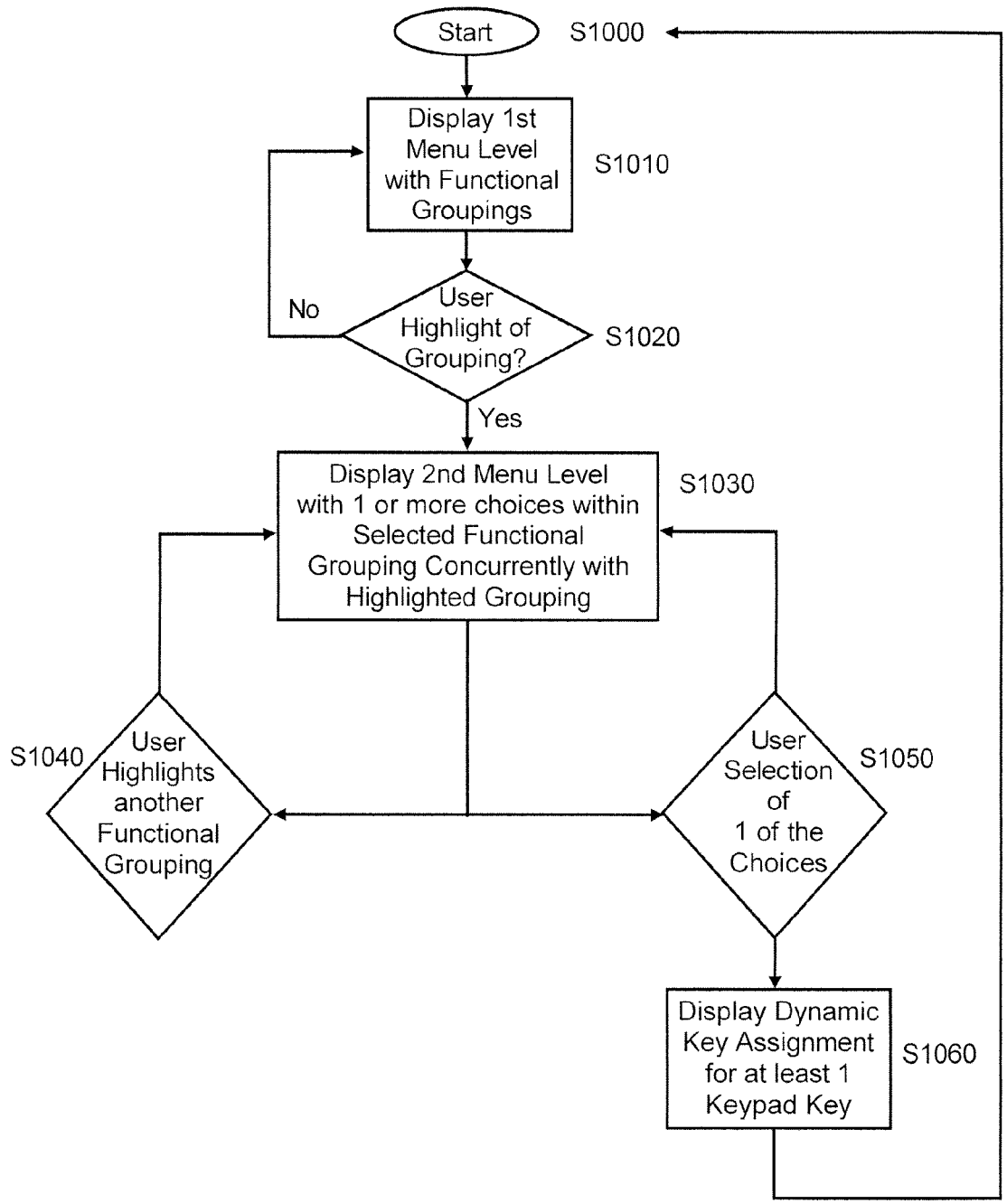

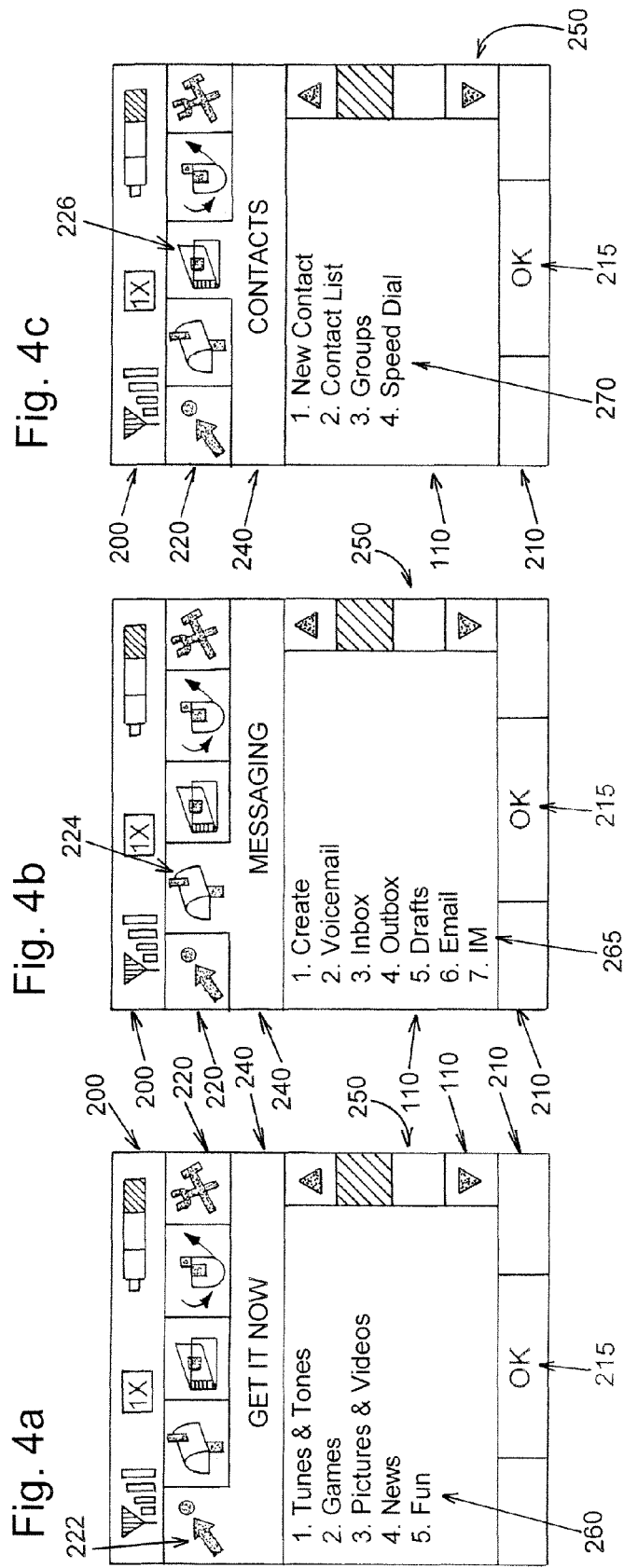

METHOD AND DEVICE FOR PROVIDING A MULTI-LEVEL USER INTERFACE HAVING A DYNAMIC KEY ASSIGNMENT FOR A CELLULARLY COMMUNICATIVE DEVICE

FIELD OF INVENTION

The present invention relates generally to a method and device for providing a user interface having concurrently displayed menu levels over a display screen of a cellularly communicative electronic device, and, more specifically, such a user interface having a dynamic key assignment for at least one key provided with the device, wherein the dynamic key assignment is a function of a user selection of a desired choice within one or more choices provided by the displayed menu levels.

BACKGROUND OF THE INVENTION

While it is currently known to provide a user interface displayable over one or more display screens of a cellularly communicative device, such as a cellular phone or a personal digital assistant, and while a variety of methods presently exist for providing such a user interface, there remains much room for improvement.

For example, user interfaces are known in which nested menus are provided. These nested menu typically provide multiple user selectable options and one or more user selectable choices within the user selectable options. Additional selections may provided within each of the user selectable options, and this process may continue indefinitely. These nested menus require the user to traverse a specific path to locate a desired function. A wrong path selection requires backing up through the nested menus.

If the user interface includes nested menus and further includes numerous functional groupings and numerous choices within each of those groupings, a user may be required to spend a substantial amount of time and effort searching for a desired selection. Alternatively, a user can memorize the location of all of the selections he or she likes to use or review a reference manual provided with the device to determine the correct locations for particular choices.

It is also known to provide with current cellularly communicative devices a keypad having one or more function keys. These keys can be used for dialing and also to operate various device functions. These keys typically have static operational assignments that are independent of the functions being implemented or the choices being selected by the user of the device. For example, a device may typically include a key which is assigned a "select" or "enter" function. This operational assignment is static in that it exists independently of the particular device function with which the key is being utilized. Thus, regardless of whether a user is entering and storing information, making a telephone call, or accessing a message, the "enter" or "select" key would always have that particular function. Current devices may also have functional key assignments that are static, but usable only within limited device operations.

The use of static key assignments is often annoying to users and inefficient from a system hardware perspective. Static key assignments are annoying because a user typically has to memorize the assigned functions for particular keys (which are typically not labeled) or consult a user manual to accurately determine the assigned function for particular keys. This is particularly annoying if there are large numbers of key assignments for a user to memorize or look up. Static key assignments are also inefficient because, particularly when a device provides a large number of functions, there is required a concomitantly large number of keys to access and implement the functions. Also, if a large number of functions is provided, not only might every key on a typical keypad be required to represent an assigned operation, additional keys might be needed in order to capture all of the operational key assignments required. Alternatively, a user might be required to remember multiple operations for each individual key depending on with which function the key is being used.

It would be desirable to have a multi-level user interface and a method of providing such a user interface in which multiple menu levels are concurrently displayed in a single display screen, and wherein a user is permitted to advance a cursor freely within each of the menu levels to view and select from the functional groupings and the choices available within each particular functional grouping. Additionally, it would be desirable to have such a user interface and a method wherein, upon a selection by the user of one of the plurality of choices within a functional grouping, a dynamic key assignment is displayed for at least one of the keys included in a device keypad, wherein the key assignment is a function of the selected choice. The present invention satisfies this and other needs.

SUMMARY OF THE INVENTION

In accordance with one aspect of the invention, there is provided a method for providing a user interface for a cellularly communicative device. The method includes the steps of: (i) concurrently providing on a first display screen, a first menu level providing one or more functional groupings and a second menu level providing one or more choices within at least one of the functional groupings; (ii) permitting a user to advance a cursor freely across the first menu level and the second menu level to select a desired choice within the one or more choices; and (iii) providing a dynamic key assignment for at least one key included in a device keypad on a second display screen in response to the selection of the desired choice, wherein the dynamic key assignment is a function of the desired choice.

In accordance with another aspect of the invention, there is provided a user interface for a cellularly communicative electronic device having a system processor, a display screen, and a keypad including a plurality of keys. The interface includes: (i) a first display screen including a first menu level providing one or more functional groupings and a concurrently displayed second menu level providing one or more choices within at least one of the functional groupings; (ii) a cursor positionable about the display; (iii) an interface manager executing in the system processor, the interface manager configured to permit movement of the cursor across the first menu level and the second menu level to allow the user to select a desired choice within the one or more choices; and (iv) at least a second display screen provided in response to the selection of the desired choice, the second display screen displaying a dynamic key assignment for at least one of the plurality of keys, wherein the dynamic key assignment is a function of the desired choice.

In accordance with yet another aspect of the invention, there is provided a cellularly communicative electronic device. The device includes: (i) a display screen, (ii) a keypad including a plurality of keys; (iii) a user interface displayable on the display screen to a user; and (iv) a processor programmed to implement: (a) a first process thread, the first thread presenting to the user over the user interface a first display screen including a concurrently displayed first menu level providing one or more functional groupings and a second menu level providing one or more choices within at least one of the functional groupings, (b) a second process thread, the second thread permitting a user to freely advance a cursor across the first menu level and the second menu level to select a desired choice within the one or more choices, and (c) a third process thread implemented in response to the selection of the desired choice, the third thread presenting to the user over the user interface a second display screen including a dynamic key assignment for at least one of the plurality of keys, wherein the dynamic key assignment is a function of the desired choice.

In accordance with yet another aspect of the invention, there is provided a cellularly communicative electronic device. The device includes: (i) a display screen; (ii) a keypad including a plurality of keys; (iii) a system processor; (iv) a user interface displayable to a user on the display screen; (v) means for concurrently providing on a first display screen, a first menu level providing one or more functional groupings and a second menu level providing one or more choices within at least one of the functional groupings; (vi) means for permitting the user to advance a cursor freely across the first menu level and the second menu level to select a desired choice within the one or more choices; and (vii) means for providing a dynamic key assignment for at least one key included in a device keypad in response to the selection of the desired choice, wherein the dynamic key assignment is a function of the desired choice These and other aspects, features, and advantages of the present invention will be apparent from the accompanying Drawings and Description of the Preferred Embodiment.

BRIEF DESCRIPTION OF THE DRAWINGS

FIG. 2 is a flow chart illustrating a process for providing a multi-level user interface according to a preferred embodiment of the present invention;

FIG. 4a is an example of a user interface screen concurrently displaying a plurality of functional groupings and a plurality of user choices within a first functional grouping in accordance with an aspect of the present invention;

FIG. 4b is an example of a user interface screen concurrently displaying a plurality of functional groupings and a plurality of user choices within a second functional grouping in accordance with an aspect of the present invention;

FIG. 4c is an example of a user interface screen concurrently displaying a plurality of functional groupings and a plurality of user choices within a third functional grouping in accordance with an aspect of the present invention;

FIG. 5b is an example of a user interface screen arrived at from the selection of a first dynamic key assignment presented in FIG. 5a;

FIG. 6a is an example of a user interface screen arrived at from the selection of a first user choice presented in FIG. 4a;

FIG. 6b is an example of a user interface screen arrived at from the selection of a first user choice presented in FIG. 6a;

DETAILED DESCRIPTION OF THE PREFERRED EMBODIMENTS

By way of overview and introduction, a cellularly communicative electronic device is configured to have multiple menu levels displayed to a user concurrently over a first display screen. A dynamic key assignment whose particular function is assigned on the basis of the prescribed menu options can also be provided and displayed over the first display screen, or preferably over at least a second display screen.

Figure 1A:
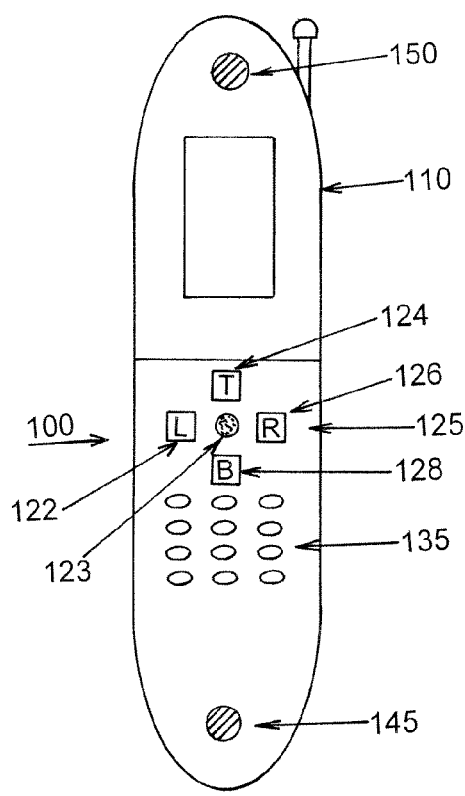
FIGS. 1a-1c are perspective views illustrating portable electronic devices with which the present invention can be used.
Figure 1B:
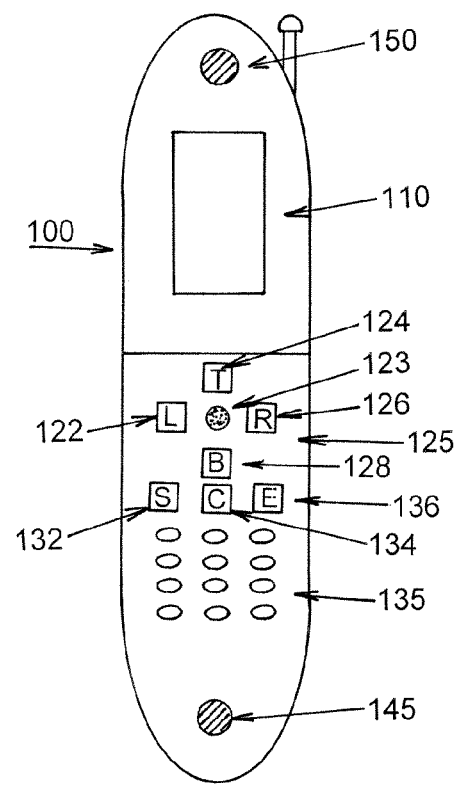

Referring to FIGS. 1a and 1b, one type of electronic device, a cellular phone 100 is shown. Phone 100 includes a keypad 135, navigation keys 125, function keys 132, 134, 136, and a display screen 110. The navigation keys may include multiple directional navigation keys 122, 124, 126, 128 and a trackball 123 to control cursor movement. Phone 100 also may have an integral digital camera or video camera system 150 for taking and storing pictures and/or video and an integral recording system 145 for recording a user's voice, music, or other sounds.

Keypad 120 typically includes numbered (and lettered) keys 135 allowing a user to dial phone numbers and enter information, dedicated function keys such as a "send" key 132, an "end" key 136 and a "clear" key 134, used primarily in connection with user dialing, and various other navigation keys 125 allowing the user to navigate a user interface provided through the display screen 110 and providing access to, or allowing utilization of other phone functions such as camera system 150 and recording system 145. The navigation keys 125 may have fixed key assignments; according to the present invention, they may instead receive dynamic key assignments that vary within the different user interface screens and that may be determined as a result of prior user selected choices within the screens.

The entirety of display 110 may be used to display the user interface, or, alternatively, the display 110 may utilize only a portion of its entire area for the display of graphics and information as part of the user interface. The actual usable display area may be centered within the display 110 or may comprise any area within the display 110. Also, as shown in FIGS. 3-4, display 110 may include an informational area 200 for providing various information and data relevant to the device or the user. Such information may include system status indicators, such as signal strength, battery level, and service availability; it may also include branding information provided by the manufacturer of the phone or the cellular service provider.

Display 110 also displays a user interface that allows the user to navigate the different functions provided by the phone. Such functions typically include messaging and call functionality, such as creating and retrieving voice and data messages, contact and call information, and phone set-up and tools. The user interface can be provided in a single displayed screen, but, more typically, it is provided across a series of displayed screens. As discussed below, the user interface may also display the various device functions and selectable choices within those functions, as well as dynamic key assignments assigned to particular keys 122, 124, 126, 128 with respect to the different functions provided. A user navigates through the user interface using navigational keys 125 and trackball 123. Keypad 135 may also be used for certain limited functions, such as the entry of letters and numbers.

Figure 1C:
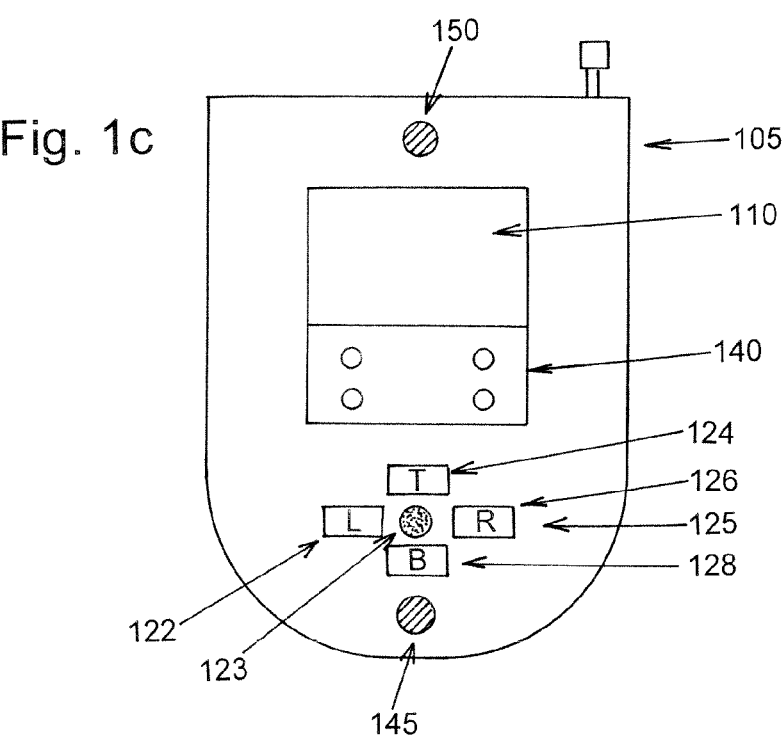

Referring to FIG. 1c, a second type of electronic device, a personal data assistant or PDA 105 is shown. PDA 105 has electronic circuits that allow the device to operate over a cellular network. Of relevance, PDA 105 may have a number of navigation and data entry keys 122, 124, 126, 128, a trackball 123, and a display screen 110. PDA 105 may also have a still or video camera 150 and a sound recording system 145. While two types of cellularly communicative electronic devices have been shown, the present invention is capable of use with other devices that are cellularly communicative.

The electronic device 100 further includes an internal central processor (not shown) and an internal or external memory (not shown). Any type of processor or memory suitable for such devices may be used. One or more software programs execute in the processor and are stored in the memory to permit the functionality of the electronic device, including the user interface of the present invention. The present invention is not limited to any particular operating system or programming language for the software.

A preferred method for providing a multi-level user interface displaying a dynamic key assignment is illustrated in FIG. 2. Software code resident in the processor of the device 100/105 begins the method at step S1000. At step S1010, a first menu level providing one or more functional groupings is displayed to the user over a first display screen. The first menu level may be displayed horizontally, vertically, or in some other prescribed orientation. The user may advance a cursor freely across the first menu level to highlight a functional grouping using trackball 123 or keypad 135. As tested at step S1020, if the user has not highlighted one of the functional groupings, the first menu level displaying all of the functional groupings can remain on the display indefinitely or can be replaced by an idle screen if any of the keys have not been activated for a set period of time.

Once the user has highlighted a particular functional grouping, at step S1030, a second menu providing one or more choices within the highlighted functional grouping is concurrently displayed over the first display screen. Once again, the second menu level may be displayed horizontally, vertically or in another prescribed orientation. The concurrent display of the highlighted functional grouping and choices available within that functional grouping over a single display screen departs from prior approaches which typically presented the functional groupings and the choices within the functional groupings over separate display screens. Once the one or more choices within the highlighted functional grouping is displayed at step S1030, the user may advance the cursor freely across the one or more choices to select a desired choice; alternatively, the user may advance the cursor freely across the one or more functional groupings to highlight another functional grouping.

If the user highlights another functional grouping, as tested at step S1040, a second menu level presenting one or more choices within the newly highlighted functional grouping is concurrently displayed with the first menu level over the first display screen at step S1030. Alternatively, if the user selects one of the choices within the functional grouping, as tested at step S1050, a second display screen can be displayed at step S1060 which provides a dynamic key assignment for at least one key included in the device keypad. Alternatively, the dynamic key assignment may be provided over part of the first display screen. The dynamic key assignment is a function of the selected choice. The dynamic key assignment may be provided over a single display screen or over multiple display screens. Additionally, the dynamic key assignment may be provided for a single key or for multiple keys. Following the display of a dynamic key assignment at step S1060 and the display of any additional screens necessary to present and implement the selected choice, the method returns to the starting point at step S1000.

Figure 3A:
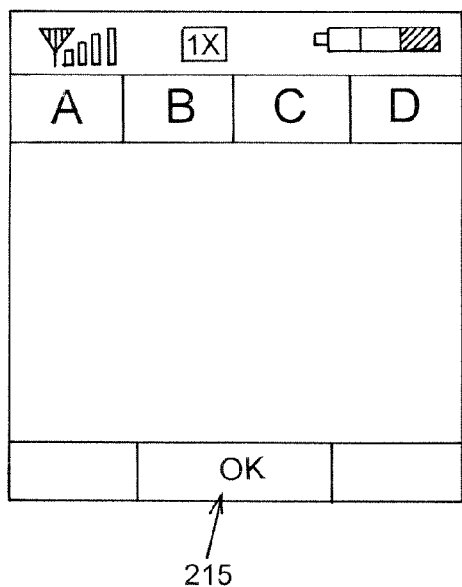
FIG. 3a is an example of a user interface screen providing a plurality of horizontally displayed functional groupings in accordance with an aspect of the present invention.
Figure 3B:
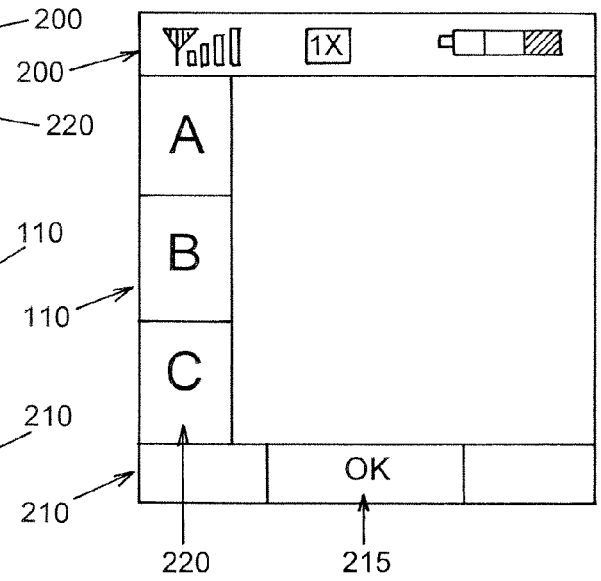
FIG. 3b is an example of a user interface screen providing a plurality of vertically displayed functional groupings in accordance with an aspect of the present invention.
Figure 3C:
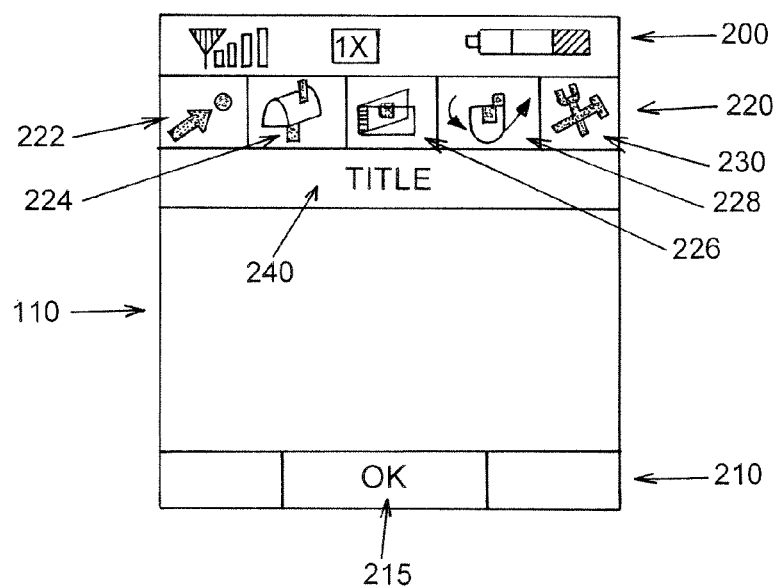
FIG. 3c is an example of a user interface screen providing a plurality of horizontally displayed functional groupings, wherein the groupings are represented by icons, in accordance with an aspect of the present invention.

FIGS. 3a, 3b, and 3c illustrate three examples of a first display screen of a user interface having a first menu level providing one or more functional groupings. The first display is provided over the display screen 110. The first display may include an information bar 200 in which various information about the device is provided. This information may include system status indicators, such as signal strength, battery level, and service availability; it may also include branding information provided by the manufacturer of the phone or the cellular service provider. As shown in FIGS. 3a-c, information bar 200 may include various icons illustrative of the information provided. It may also include symbols and/or text descriptions for providing information.

The first display also includes a first menu level 220 providing one or more functional groupings made available by the device 100, 105. These functional groupings are typically dependent on the type of device 100, 105 and the type of features offered by the device 100, 105. It will be appreciated that functional groupings are merely one way of grouping the different functions offered by the device 100, 105. It will also be appreciated that an individual functional grouping could be provided for each particular function offered by the device 100, 105 (resulting in a large number of groupings), or, alternatively, numerous related functions could be grouped together and provided within a smaller number of functional groupings.

As shown in FIG. 3a and FIG. 3c, the first menu level 220 may be displayed horizontally across the display 110; alternatively, as shown in FIG. 3b, the first menu level 220 may be displayed vertically down the display 110. The first menu level 220 may be provided anywhere within the display 110 and in any orientation. As previously discussed, the first menu level 220 may include any number of functional groupings—four are shown in FIG. 3a, three are shown in FIG. 3b, and five are shown in FIG. 3c.

Additionally, as shown in FIGS. 3a-b, the functional groupings may be represented by letters or text descriptions; alternatively, as shown in FIG. 3c, icons can be used to represent one or more of the functional groupings. In the example shown in FIG. 3c, five icons 222, 224, 226, 228, 230 are provided to represent the five different functional groupings. These five functional groupings and icons are described in more detail below. The first display screen may also include a title bar 240 (as shown in FIG. 3c) which may provide a descriptive title for the first display screen or any of the functional groupings, and a key assignment bar 210 setting forth any applicable dynamic key assignments to be provided within the screen.

Dynamic key assignments contrast with static key assignments in that, a key having a static key assignment will perform the same operation regardless of with which type of device functionality it is used. For example, a key having a static key assignment might perform the "enter" or "select" operation every time it is used, regardless of whether it is being used in connection with saving contact information or composing an e-mail message. In contrast, a key having a dynamic key assignment may perform different operations depending on the context in which it is used. For example, a key having a dynamic key assignment might perform a "save" operation when used for editing system settings but might perform an "add" function when used to attach pictures or video to a voice or e-mail message.

In the examples shown in FIGS. 3a-c, a single dynamic "OK" key assignment 215 is provided to enable a user to select from among the one or more functional groupings 220. Alternatively, the user may use a cursor or trackball 123, a scroll bar (250, as shown in FIGS. 4a-e), or the numbered/lettered keypad 135 provided with the device to select from among the functional groupings.

In the examples shown in FIGS. 3a-c, the "OK" key assignment 215 is displayed in the middle of the key assignment bar 210 so as to correspond to the top key in the device keypad 124 located beneath the key assignment bar 210. In the three example of devices shown in FIGS. 1a-c, four functional keys 122, 124, 126, 128 are provided to relationally correspond to four areas (left side, top, bottom, right side) of the key assignment bar 210. It can be appreciated that any number of functional keys may be provided with the device 100, 105 to correspond to a like number of areas within the key assignment bar 210. It can also be appreciated that a key assignment bar 210 having a single area for displaying key assignments may be used, which single area may display key assignments for any number of function keys. For example, the single area might provide messages such as: "Left navigational key: enter function."

FIGS. 4a-4e illustrate five examples of a first display screen of a user interface having a first menu level 220 providing one or more functional groupings and a second menu level 260, 265, 270, 275, 280 providing one or more choices within the functional groupings. In the examples shown, the first menu level 220 includes five functional groupings 222, 224, 226, 228, 230 and the second menu level 260, 265, 270, 275, 280 includes a plurality of choices within each of the five functional groupings. It will be appreciated that any number of functional groupings and any number of available choices within those functional groupings may be provided. It will also be appreciated that one or more choices may be provided for only certain of the one or more functional groupings.

Similar to the examples of the first display screen shown in FIGS. 3a-c, the examples of the first display screen in FIGS. 4a-e include an information bar 200 (shown with various icons representative of system functions), a horizontally displayed first menu level 220 (shown with five functional groupings), a title bar 240 providing a title for each of the functional groupings, and a key assignment bar 210 including an "OK" key assignment 215 corresponding to the top navigational key 124. The examples shown in FIGS. 4a-e also include a vertically displayed second menu level 260, 265, 270, 275, 280 providing a plurality of choices for each of the functional groupings and a scroll bar 250 (as discussed above) for enabling navigation through the choices provided.

In the example shown in FIG. 4a, it is assumed that a user has elected the first functional grouping 222 provided in the first menu level 220. A user may elect from the functional groupings 222, 224, 226, 228, 230 and from the choices available within each of the groupings by utilizing a freely positionable cursor that is moveable through the display 110. The cursor can be moved using a trackball or mouse 123 or by using the scroll bar 250. The functional groupings and choices therein may also be selected by using an alpha-numeric keypad 135 provided with the device 100, 105.

In the example shown in FIGS. 4a, the first functional grouping 222 represents a grouping corresponding to various services and for-pay services available through the device 100, 105. The first functional grouping 222 is illustrated through the use of a representative icon and has been given a title "Get It Now" as is shown in the title bar 240. The representative icon shown includes a pointed arrow and a ball. However, any icon visually representative of the functional grouping may be used instead. Corresponding to the first functional grouping 222, are a plurality of choices 260 available within that grouping. These choices may include, as in the example shown, tunes and tones, games, pictures and videos, news, and fun. It will be appreciated that any of these may be excluded from the choices provided 260 and that any other array of choices corresponding to the first functional grouping 222 may be included instead.

As previously discussed, a user may elect a desired choice from the one of the choices provided 260 using the a freely positionable cursor. Alternatively, if the desired choice is not present within the first functional grouping 222, a user may re-position the cursor to highlight one of the other functional groupings 224, 226, 228, 230. The example shown in FIG. 4b illustrates the highlighting by a user of the second functional grouping 224, which is represented by a mailbox icon (it will be appreciated that any other icon could be used as well) and includes a "Messaging" title as is provided in the title bar 240.

The second functional grouping 224 includes a plurality of choices relating to the messaging functionality of the device 100, 105. In the example shown in FIG. 4b, the choices include creating a text message, accessing voicemail, accessing an inbox or outbox, accessing draft messages, creating an e-mail message and creating an instant message. Once again, it will be appreciated that any of these choices may be excluded from the choices provided and that any other array of choices corresponding to the second functional grouping 224 may be included instead. From the first display screen shown in FIG. 4b, the user may position the cursor to select a desired choice from the plurality of choices 265 within the second functional grouping 224, or the user may highlight any of the other functional groupings 222, 226, 228, 230.

Figure 4E:
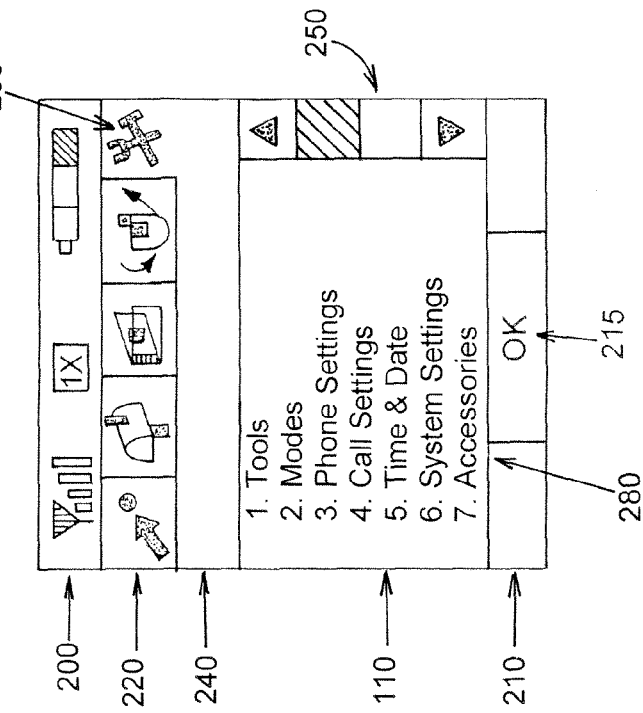
FIG. 4e is an example of a user interface screen concurrently displaying a plurality of functional groupings and a plurality of user choices within a fifth functional grouping in accordance with an aspect of the present invention.
Figure 4D:
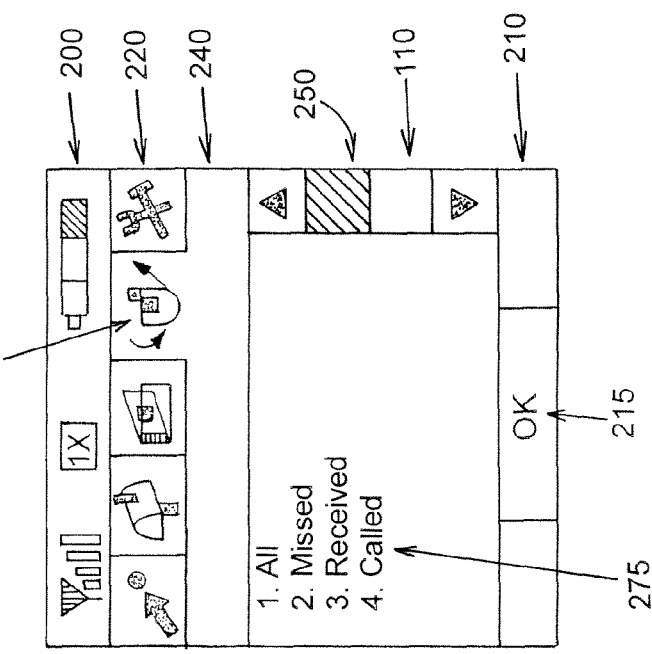
FIG. 4d is an example of a user interface screen concurrently displaying a plurality of functional groupings and a plurality of user choices within a fourth functional grouping in accordance with an aspect of the present invention.

The examples shown in FIGS. 4c-e illustrate the second menu level providing a plurality of choices within the third, fourth and fifth functional groupings 226, 228, 230 of the first menu level 220. In these examples, the third functional grouping 226 has been labeled "Contacts" as shown in the title bar 240 and includes choices 270 for creating a new contact, accessing a contacts list, accessing speed dial functionality, and accessing a contacts group list; the fourth functional grouping 228 has been labeled "Recent Calls" as shown in the title bar 240 and includes choices 275 for viewing all recent calls, viewing all missed calls, viewing all received calls, and viewing all numbers called; and the fifth functional grouping 280 has been labeled "Settings & Tools" as shown in the title bar 240 and includes choices for accessing system tools, accessing system modes, modifying phone, call and system settings, adjusting the time and date, and accessing other accessories. The user's selection of choices within these functional groupings 226, 228, 230 operates as described above in connection with the first and second functional groupings 222, 224.

Figure 5A:
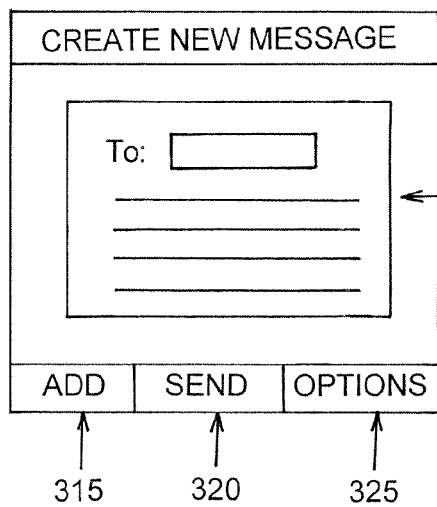
FIG. 5a is an example of a user interface screen arrived at from the selection of a first user choice presented in FIG. 4b.

FIG. 5a illustrates an example of a second display screen of a user interface that is provided upon a user selection of a "Create Message" choice as the desired choice from the plurality of choices presented for the second functional grouping 224 illustrated in FIG. 4b. The second display includes a title bar 300, in this case labeled "Create New Message," and a text box 310 in which a message can be entered by the user. The second display also includes a key assignment bar 210 providing three dynamic key assignments useable within the "Create New Message" functionality—an "Add" key assignment 315 over the left navigational key 122, a "Send" key assignment 320 over the top navigational key 124 and an "Options" key assignment 325 over the right navigational key 126. Through the use of the "Options" key 325, various options that can be used in connection with creating the message can be displayed. These options can be displayed over the second display, as part of the original first display, or over one or more additional displays. Through the use of the "Send" key 320, the message entered into the text box 310 can be sent to a third party. Through the use of the "Add" key 315, a user can be prompted to add various items to the message. This can occur over any number of the display screens.

Figure 5B:
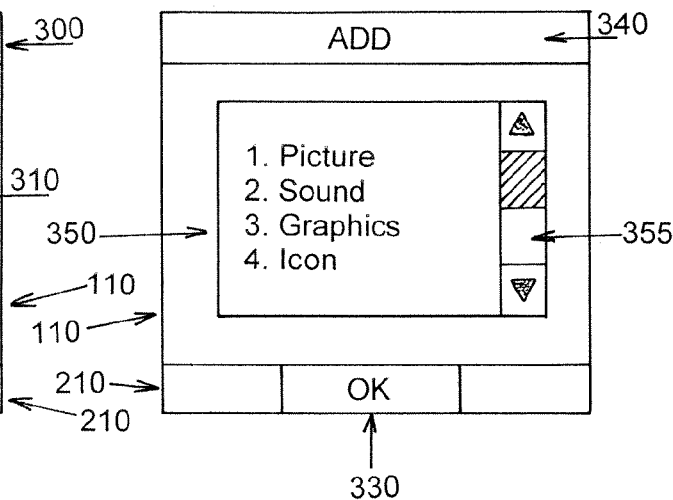

FIG. 5b shows an example of a subsequent display screen displayable upon the selection of the "Add" key 315 shown in FIG. 5a by the user. This display screen includes an "Add" title in the title bar 340, a key assignment bar 210 having an "Ok" key assignment 330 over the top navigational key 124, a list of items 350 that can be added to the message (for example, FIG. 5b provides for adding a picture attachment, a sound file attachment, graphics or an icon), and a scroll bar 355 that can be utilized by the user to select from the items 350. It will be appreciated that any items provided in the list 350 shown in FIG. 5b may be removed and other items may be included instead, such as adding quick text to a message, adding recipients, adding a subject line and the like.

Figure 6A:
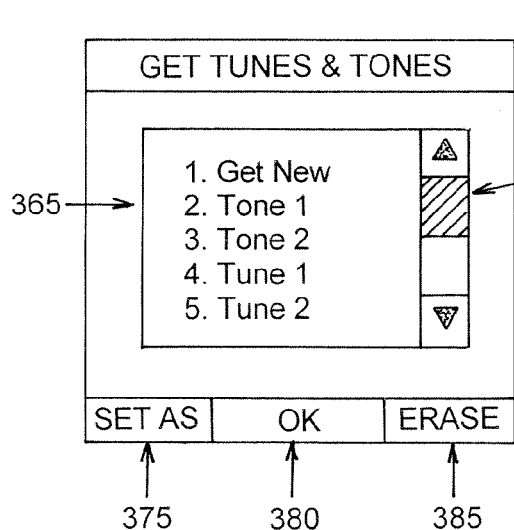

FIG. 6a illustrates an example of a second display of a user interface that is provided upon a user selection of a "Get Tunes & Tones" choice as the desired choice from the plurality of choices presented for the first functional grouping 222 illustrated in FIG. 4a. The second display includes a title bar 360, in this case labeled "Get Tunes & Tones," a list of options 365 useable in connection with retrieving a new tune or ring-tone, and a scroll bar 370 usable to select from the options list 365. In the example shown in FIG. 6a, the options provided include obtaining a new tune or ring-tone and retrieving one of two stored tunes or one of two stored ring-tones. It will be appreciated that any of these options can be eliminated and replaced with other options applicable to this functionality.

Figure 6B:
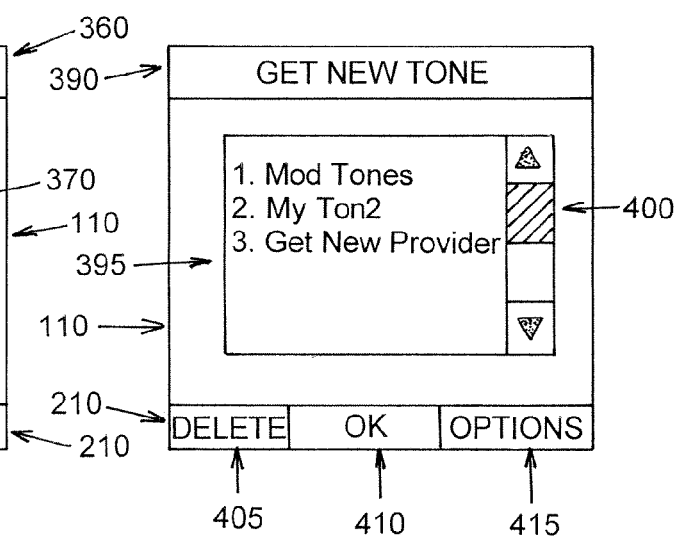

The second display also includes a key assignment bar 210 providing three dynamic key assignments useable within the "Get Tunes & Tones" functionality—a "Set As" key assignment 375 over the left navigational key 122, an "OK" key assignment 380 over the top navigational key 124 and an "Erase" key assignment 385 over the right navigational key 126. Through the use of the "Erase" key 385, any of the stored tunes or ring-tones can be erased. Through the use of the "OK" key 380, any of the options presented in the options list 365 can be selected when the cursor is placed over that option or when the number of the option is entered. Through the use of the "Set As" key 375, various pre-recorded tunes or ring-tones, and various newly recorded tunes or ring-tones (using the recording system 145) can be stored within the options list 365. These tunes or tones and the functionality for obtaining them can be displayed over the second display or over one or more additional displays Shown in FIG. 6b is an example of a subsequent display screen displayable upon the selection of the "Get New Tunes & Tones" option from the list of options 365 provided in the example shown in FIG. 6a. This display screen include a "Get New Tone" title in the title bar 390, a list of options 395 usable in connection with retrieving a new tone and a scroll bar 400 usable to select from the group of options 395. The display screen also includes a key assignment bar 210 having dynamic key assignments including a "Delete" key assignment 405 over the left navigational key 122, an "OK" key assignment 410 over the top navigational key 124 and an "Options" key assignment 415 over the right navigational key 126.

Figure 7:
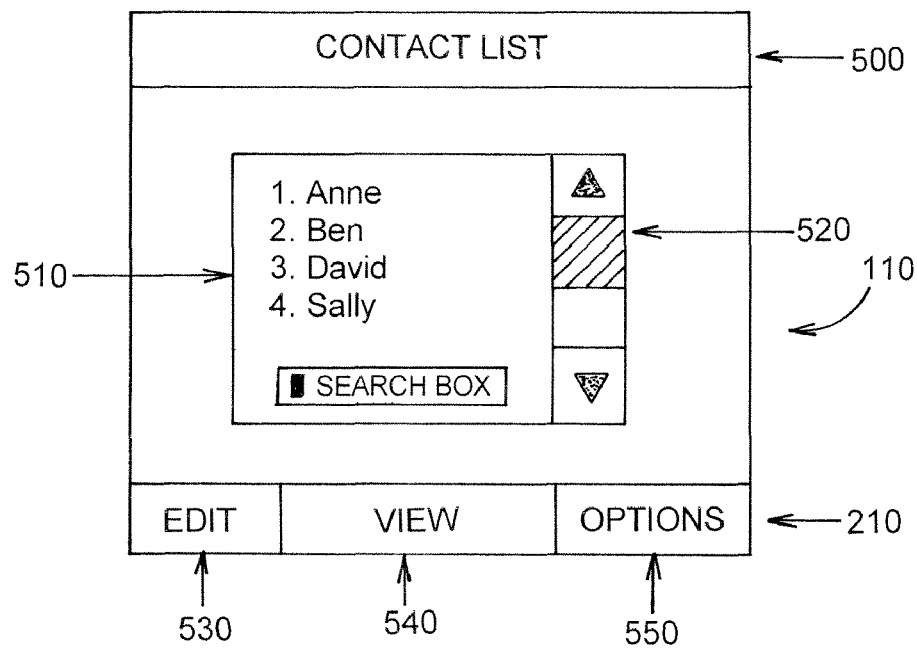
FIG. 7 is an example of a user interface screen arrived at from the selection of a second user choice presented in FIG. 4c.

Another example of a second display screen of a user interface is shown in FIG. 7. This display is provided upon a user selection of a "Contact List" choice as the desired choice from the plurality of choices presented for the third functional grouping 226 illustrated in FIG. 4c. This example includes a title bar 500, in this case labeled "Contact List," a list of stored contacts for whom information can be entered and retrieved 510, a search box to search through the list of contacts 510, and a scroll bar 520 usable to select from the stored contacts 510.

The display screen also includes a key assignment bar 210 having dynamic key assignments including an "Edit" key assignment 530 over the left navigational key 122, a "View" key assignment 540 over the top navigational key 124 and an "Options" key assignment 550 over the right navigational key 126. Through the use of the "Edit" key 530, any of the stored contact list information can be edited. This can be accomplished over the second display screen or over any number of additional display screens. Through the use of the "View" key 540, any of the stored contacts list information can be viewed; through the use of the "Options" key 550, various options that can be used in connection with storing and editing the contacts list information can be displayed and implemented. Once again, these can be accomplished over the second display screen or over any number of additional screens.

Figure 8:
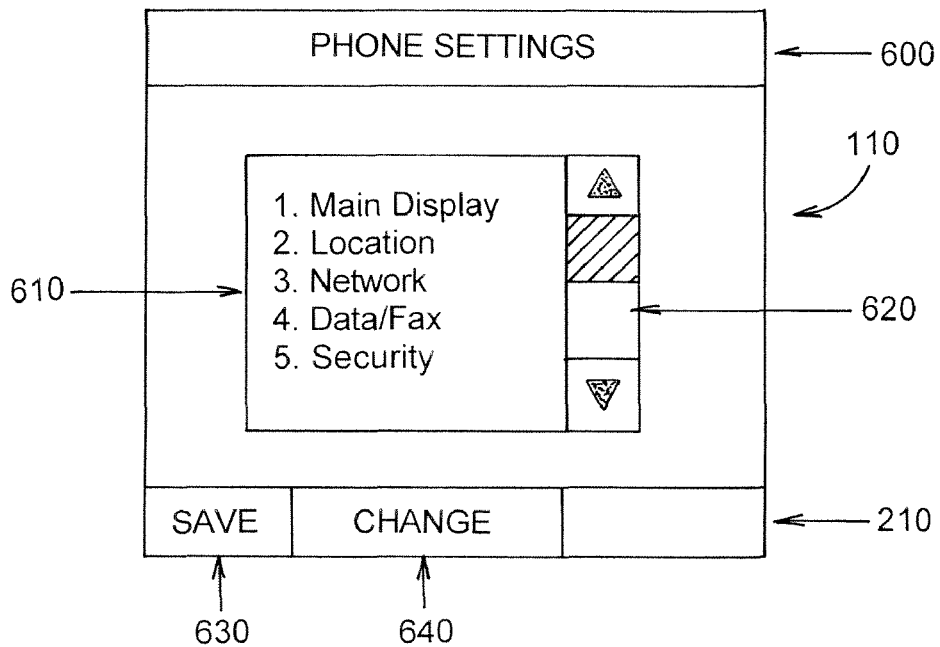
FIG. 8 is an example of a user interface screen arrived at from the selection of a third user choice presented in FIG. 4e.

Yet another example of a second display of a user interface is shown in FIG. 8. This display is provided upon a user selection of a "Phone Settings" choice as the desired choice from the plurality of choices presented for the fifth functional grouping 230 illustrated in FIG. 4e. This example includes a title bar 600, in this case labeled "Phone Settings," a list of options 610 useable in connection with phone settings, and a scroll bar 620 usable to select from the list of options 610. In the example shown, the list of options 610 includes main display settings, location settings, network settings, data/fax settings and security settings. The display screen also includes a key assignment bar 210 having dynamic key assignments including a "Save" key assignment 630 over the left navigational key 122 and a "Change" key assignment 640 over the top navigational key 124. It will be appreciated that a second display screen displaying a dynamic key assignment may be provided for all of the choices presented for each of the functional groupings shown in FIGS. 4a-e.

While the invention has been described in connection with certain preferred embodiments thereof, it is not limited to such embodiments but rather is defined by the scope of the claims appended hereto.

We claim:

1. A cellularly communicative electronic device, comprising:
   electronic circuitry that allows the cellularly communicative electronic device to operate over a cellular network;
   a display;
   a keypad, including a plurality of alpha or numeric keys and a dynamically assignable function key, wherein the dynamically assignable function key is not one of the alpha or numeric keys of the keypad; and
   a processor and an interface manager executing in the processor which configure the cellularly communicative electronic device to implement:

(1) a first process thread, involving displaying a first screen on the display, the first screen concurrently comprising:
   (a) a first level menu providing a plurality of functional groupings for user selection, on a first area of the displayed first screen, wherein: each of the functional groupings represents a different group of cellular device functions offered by the cellularly communicative electronic device, and the cellular device functional groupings displayed in the first level menu include call messaging, contacts list, obtaining device services, recent calls, and settings and tools; and
   (b) on a second area of the displayed first screen, a second level menu of choices for user selection from within a selected one of the functional groupings of the first level menu;
(2) a second process thread, responsive to a cursor control input from a user, involving moving a cursor on the display across at least the second level menu to indicate a selection of one of the choices on the displayed second level menu; and
(3) a third process thread, responsive to a user acceptance of the selected one of the choices, involving displaying a second screen on the display, the second screen concurrently comprising:
   (a) an area containing information relating to the selected choice; and
   (b) a key assignment area displaying a function of the cellularly communicative device associated with the selected choice, dynamically assigned to the function key of the cellularly communicative device, wherein:
the processor is programmed to cause the cellularly communicative device to perform the dynamically assigned function associated with the selected choice, upon user activation of the function key during the display of the second screen;
the displayed second level menu presents choices arranged in a prescribed order; and
the prescribed order is a function of frequency of previous user selections of one or more of the choices.

2. The device of claim 1, wherein:
the processor and interface manager further configure the device to implement a fourth process thread, the fourth thread involving presenting to the user on the display a system background display screen, and
the background display screen is selectable by the user.

3. The device of claim 1, wherein the first level menu includes icons visually evocative of the respective functional groupings.

4. The device of claim 1, wherein:
when the call messaging functional grouping is the one of the functional groupings selected from the first level menu, the second level menu includes choices selected from the group consisting of: creating a message, voicemail, inbox, outbox, draft messages, e-mail messages and instant messages.

5. The device of claim 1, wherein:
when the device services functional grouping is the one of the functional groupings selected from the first level menu, the second level menu includes a for-pay service choice.

6. The device of claim 1, wherein:
when the device services functional grouping is the one of the functional groupings selected from the first level menu, the second level menu includes choices selected from the group consisting of: receiving music, receiving games, receiving pictures, receiving movies, receiving news, and receiving information.

7. The device of claim 1, wherein:
when the contacts functional grouping is the one of the functional groupings selected from the first level menu, the second level menu includes choices selected from the group consisting of: new contacts, contacts list, groups, and speed dial.

8. The device of claim 1, wherein:
when the recent calls functional grouping is the one of the functional groupings selected from the first level menu, the second level menu includes choices selected from the group consisting of: all calls, missed calls, received calls, and numbers called.

9. The device of claim 1, wherein:
when the settings and tools functional grouping is the one of the functional groupings selected from the first level menu, the second level menu includes choices selected from the group consisting of: device tools, device modes, device settings, call settings, system settings, accessories, time settings and date settings.

10. The device of claim 1, wherein the key assignment area displays a plurality of functions dynamically assigned to a plurality of the keys of the keypad.

* * * * *